(12) United States Patent
Wei et al.

(10) Patent No.: US 8,644,333 B2
(45) Date of Patent: Feb. 4, 2014

(54) METHOD AND APPARATUS FOR REALIZING CROSS-CONNECT OF OPTICAL CHANNEL DATA UNIT-K

(75) Inventors: Yuxian Wei, Shenzhen (CN); Yan Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 131 days.

(21) Appl. No.: 13/259,880

(22) PCT Filed: Sep. 28, 2009

(86) PCT No.: PCT/CN2009/074296
§ 371 (c)(1),
(2), (4) Date: Dec. 28, 2011

(87) PCT Pub. No.: WO2010/145106
PCT Pub. Date: Dec. 23, 2010

(65) Prior Publication Data
US 2012/0093506 A1    Apr. 19, 2012

(30) Foreign Application Priority Data

Jun. 30, 2009  (CN) .......................... 2009 1 0088607

(51) Int. Cl.
*H04J 3/00* (2006.01)
*H04J 14/00* (2006.01)
(52) U.S. Cl.
USPC ........................................... 370/464; 398/52
(58) Field of Classification Search
None
See application file for complete search history.

(56) References Cited

U.S. PATENT DOCUMENTS

| | | | |
|---|---|---|---|
| 7,782,843 B2 | 8/2010 | Zou et al. | |
| 2003/0123493 A1* | 7/2003 | Takahashi | 370/539 |
| 2007/0076769 A1 | 4/2007 | Zou | |
| 2007/0264015 A1* | 11/2007 | Li et al. | 398/45 |
| 2009/0074410 A1* | 3/2009 | Zou et al. | 398/52 |

FOREIGN PATENT DOCUMENTS

| | | |
|---|---|---|
| CN | 1734986 A | 2/2006 |
| CN | 101389146 A | 3/2009 |
| WO | 2006051041 A1 | 5/2006 |

\* cited by examiner

*Primary Examiner* — Clemence Han
(74) *Attorney, Agent, or Firm* — Christopher L. Parmelee; Walker & Jocke

(57) ABSTRACT

The present invention discloses a method for realizing cross-connect of optical channel data units (ODUk), which comprises: mapping the accessed services to the ODUk, and mapping the services mapped to the ODUk to the ODUk time slot frames according to the requirements of the time slot frames; mapping the ODUk time slot frames to the intermediate frame structures; performing the cross-connect for ODUk services in the intermediate frame structures. The present invention also discloses an apparatus for realizing cross-connect of ODUk. The present invention directly supports cross-connect of ODUk, so as to realize simple scheduling for the Optical Transport Network (OTN) services, and improve the resource utilization factor and the integration level.

11 Claims, 4 Drawing Sheets

| | MSB Bit 7 | Bit 6 | Bit 5 | Bit 4 | Bit 3 | Bit 2 | Bit 1 | Bit 0 LSB |
|---|---|---|---|---|---|---|---|---|
| Bit 3 to Bit 0 of MFAS =0000b | ODUk maintenance signal type | | Time slot ID | | | RES | ODU10G ID | |
| Bit 3 to Bit 0 of MFAS =0001b | ODUk type | | | | Serial Number of this time slot in ODUk | | | |
| Bit 3 to Bit 0 of MFAS =0010b | ODUk ID | | | | | | | |
| Bit 3 to Bit 0 of MFAS =0011b | Port ID | | | | | | Port Type | |
| Bit 3 to Bit 0 of MFAS =0100b | Slot ID | | | | | | | |
| Bit 3 to Bit 0 of MFAS =0101b | Rack ID plus Sub rack ID | | | | | | | |
| Bit 3 to Bit 0 of MFAS =0110b | Low bytes in network element ID | | | | | | | |
| Bit 3 to Bit 0 of MFAS =0111b | High bytes in network element ID | | | | | | | |
| Bit 3 to Bit 0 of MFAS =1111b | Reserved | | | | | | | |

Fig. 4

METHOD AND APPARATUS FOR REALIZING CROSS-CONNECT OF OPTICAL CHANNEL DATA UNIT-K

FIELD OF THE INVENTION

The present invention relates to cross-connect technology for transport network services in communication field, and in particular to a method and an apparatus for realizing cross-connect of Optical Channel Data Unit-k (ODUk).

BACKGROUND OF THE INVENTION

At present, cross-connect methods based on Synchronous Digital Hierarchy (SDH) technology are generally used in the optical transport networks, and by way of these methods, various services are mapped to SDH time slots or SDH frames firstly and then the various services are crossed according to the Virtual Container (VCn) granule in the SDH frames, so as to achieve the objective that the crossing granularity becomes relatively small.

However, in Optical Transport Networks (OTNs), especially in backbone networks, generally the service types are of OTN frame structures. Thus, if the cross-connect with relatively small granularity is carried out, it is required to firstly encapsulate the OTN services to SDH according to the size of the services and then the cross-connect is performed. Such a process is relatively complex and the resource advantages of small cross granularity of SDH cannot be fully used, so the relatively high integration requirement of OTN cross-connect may not be satisfied.

SUMMARY OF THE INVENTION

According to the issues in relation to the processing complexity, relatively low resource utilization and integration level for cross-connecting the OTN services existed in the prior art; and to this end, a method and an apparatus for realizing cross-connect of ODUk is provided to solve at least one of the above mentioned issues.

In order to achieve the above objective, a method for realizing cross-connect of ODUk is provided according to one aspect of the present invention, wherein the method comprises:

mapping the accessed services to ODUk, and mapping the ODUk to ODUk time slot frames according to the requirements of time slot frames;

mapping the ODUk time slot frames to intermediate frame structures;

performing cross-connect for the ODUk services in the intermediate frame structures.

The step of mapping the accessed services to the ODUk is specifically mapping the accessed services to related ODUk according to the bandwidth capacities of the services.

In terms of the method, different ODUk time slot frames have different numbers of padding areas.

The method further comprises: packaging the different time slot frames according to time slots into one of the intermediate frame structures, at the time of mapping the ODUk time slot frames to the intermediate frame structures.

An apparatus for realizing cross-connect of ODUk is also provided according to another aspect of the present invention, wherein the device comprises: a service access unit, which is configured to carry out the service access; a service mapping unit, which is configured to map the services accessed by the service access unit to ODUk; a time slot frame mapping unit, which is configured to map the services mapped to the ODUk to ODUk time slot frames; an intermediate frame mapping unit, which is used to map the ODUk time slot frames to intermediate frame structures; a cross-connect unit, which is configured to perform cross-connect for the ODUk services in the intermediate frame structures.

The service mapping unit is further configured to map the accessed services to the related ODUk according to the bandwidth capacity of the services.

The intermediate frame mapping unit is further configured to package different time slot frames into one of intermediate frame structures according to time slots at the time of mapping the ODUk time slot frames to the intermediate frame structures.

The apparatus further includes a control and communication interface unit, which is configured to control the operations of the service mapping unit, the time slot frame mapping unit and the intermediate frame mapping unit.

The apparatus further includes a backplane interface unit, which is configured to transmit the ODUk services after the cross-connect.

By the way of the method and the apparatus for realizing cross-connect of ODUk provided by the present invention, the accessed services is mapped to ODUk, and then the services mapped to the ODUk are mapped to ODUk time slot frames according to the requirement of the time slot frames; the ODUk time slot frames are mapped to intermediate frame structures, and the cross-connect of the ODUk services in the intermediate frame structures is performed.

Since the present invention directly supports the cross-connect of the ODUk, without carrying out the operations of mapping and de-mapping from OTN services to SDH services, the present invention is more suitable for the cross-connect of OTN services and simple to be implemented. In addition, the present invention can take full advantages of the bandwidth, and can achieve the objective of cross-connect of ODUk due to appropriate granularity in cross-connect; and the information of the services is attached directly to the frame structures, which results in the relatively high resource utilization ratio and integration level.

BRIEF DESCRIPTION OF THE DRAWINGS

The drawings illustrated herein provide a further understanding of the present invention and form a part of the present application. The exemplary embodiments and the description thereof are used to explain the present invention without unduly limiting the scope of the present invention, wherein:

FIG. 4 is a structure schematic diagram of CM overhead information for an intermediate frame structure according to an the embodiment of the present invention.

DETAILED DESCRIPTION OF EMBODIMENTS

The technical solution of the present invention will be described in detail with reference to the drawings and specific embodiments.

Figure 1:
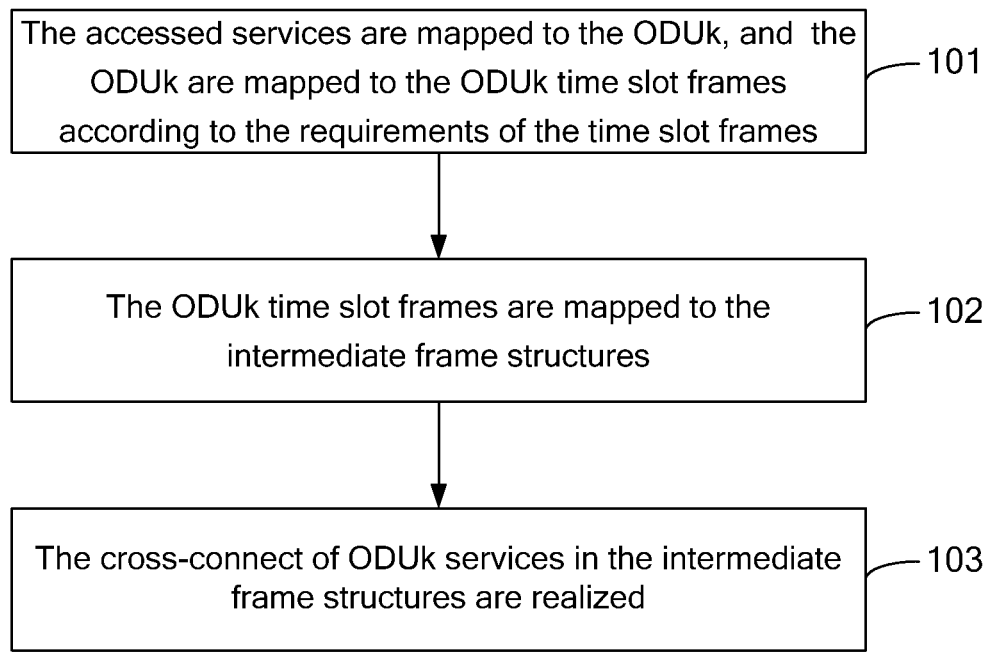
FIG. 1 is a flow chart of a method for realizing cross-connect of ODUk according to an embodiment of the present invention.

According to an embodiment of the present invention, a method for realizing cross-connect of ODUk is provided to accomplish cross-connecting ODUk of OTN services. FIG. 1 is a flow chart of the method for realizing cross-connect of ODUk according to an embodiment of the present invention. As shown in FIG. 1, the method mainly comprises following steps from Step 101 to Step 103:

Step S101, the accessed services are mapped to the ODUk, and the ODUk are mapped to ODUk time slot frames according to the requirements of the time slot frames.

In case that OTN services are to be accessed, different accessed services could be pre-processed and then the pre-processed OTN services could be mapped to the ODUk, a specific procedure of which is that different OTN services are mapped to corresponding ODUk according to the bandwidth capacity of the services, wherein, the value of K is 0, 2, 3, 4, and so on. For example, a Gigabit Ethernet (GE)/1 G Fiber Channel (1 GFC) service is mapped to an ODU0, wherein the ODU0 is a kind of customized frame structure, which is similar to the frame structure of ODU1 or ODU2, etc, and the rate of the ODU0 is half of that Optical Transport Unit-1 (OTU1); a 2 GFC service is mapped to one ODU1; and a Synchronous Transport Module-16 (STM-16) service is mapped to one ODU1.

Figure 2:
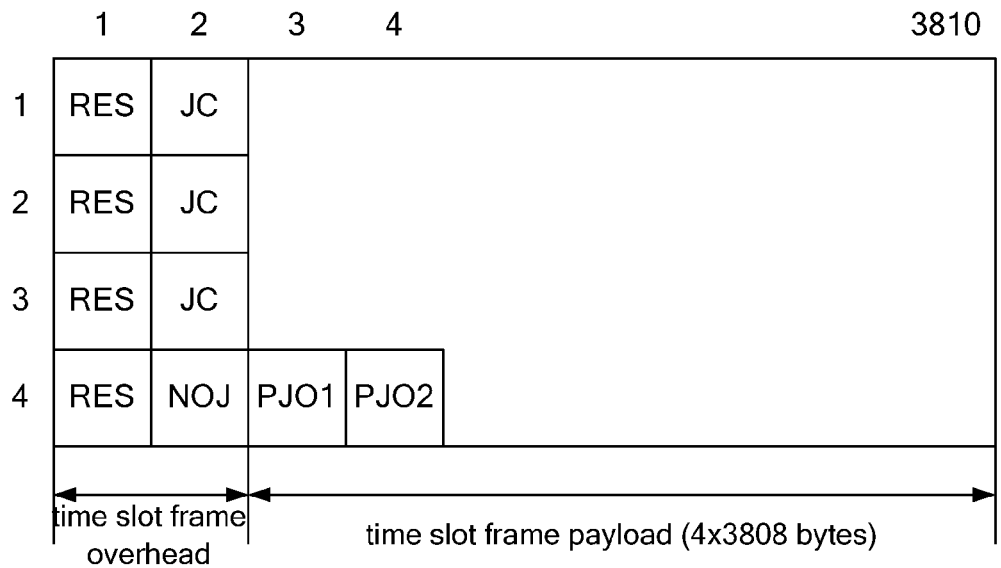
FIG. 2 is a schematic diagram of the frame structure of ODUk time slot frame according to an embodiment of the present invention.

The services mapped to the ODUk are mapped to ODUk time slot frames according to the requirements of time slot frames (for example, the requirement of rate). The frame structures of ODUk time slot frames are shown as FIG. 2, wherein different ODUk time slot frames with different values of k may have different numbers of padding areas. For example, 32 or 48 columns may be filled in an ODU0 time slot frame; 16 or 32 columns may be filled in an ODU1 time slot frame; and 0 or 16 columns may be filled in an ODU2 time slot.

Step S102, the ODUk time slot frames are mapped to intermediate frame structures.

Figure 3:
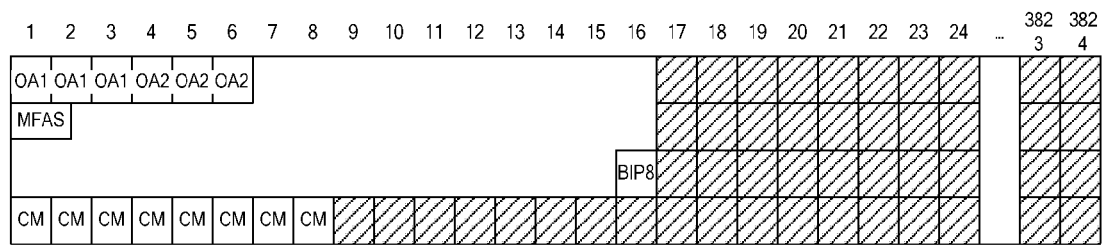
FIG. 3 is a schematic diagram of an intermediate frame structure according to an embodiment of the present invention.

A plurality of ODU0 time slot frames can be mapped to an intermediate frame structure along with a plurality of ODU1 time slot frames, when mapped to the intermediate frame structures. The frame structure of the above mentioned intermediate frame is shown as FIG. 3, wherein the whole frame is divided into many time slots, and for each time slot, all information of the payload (such as the actual ODUk information, IDs of the occupied time slots in the ODUk information, etc.) is stored in the corresponding Connection Monitor (CM) overhead information. There are fixed corresponding relationships between the CM overhead information and the time slots, i.e., the CM overhead information in column 1 of row 4 corresponds to Time Slot 0, the CM overhead information in column 2 of row 4 corresponds to Time Slot 1, until the CM overhead information in column 8 of row 4 corresponds to Time Slot 7. The main purpose of CM overhead information is to indicate the state information of the time slots. For each time slot, the CM overhead information is of a multi-frame structure with 16 bytes, and particularly the CM overhead information of the intermediate frame structure is shown as FIG. 4.

If an ODU1 time slot frame is to be encapsulated to such an intermediate frame structure, a size of 2 time slots of the intermediate frame structure will be occupied, and the positions of the occupied time slots are provided in the CM overhead information in the intermediate frame structure. A plurality of combinations of intermediate frame structures can be packaged into an ODU3 time slot, i.e. an ODU3 time slot occupies all time slots of a plurality of intermediate frame structures. An intermediate frame structure can also package one ODU2 time slot or 4 ODU1 time slots, or 8 ODU0 time slots, or the intermediate frame structure can also package all these time slots together. It needs to be noted that such an intermediate frame structure is similar to that of ODUk, and there may be many kinds of rates according to service requirements, wherein the padding bytes in the time slot frame are related to the rate of the intermediate frame structure; the padding bytes in ODUk time slot frame are used to adapt the rates of time slots between the ODUk and the intermediate frame structure, and the numbers of time slots divided the intermediate frame structure may be different, which may be divided into 8 time slots or 4 time slots and so on.

Step S103, the cross-connect of ODUk services in the intermediate frame structures are realized.

Since these ODUk time slot frames are packaged in the intermediate frame structures by time slots, as long as the frame headers in the intermediate frame structures, for which the cross-connect is performed, are synchronized, the ODU0 time slots are easily crossed, just like that of SDH, and then the ODUk services after the cross-connect are transported. For example, for an intermediate frame structure at an output interface, if the port ID, and the time slot ID of an intermediate frame structure at an input interface, which are related to each ODU0 time slot, are given, then the related payload can be chosen, in such a way that it is very easy for the seamless ODUk scheduling to be achieved, while also being able to support multicast and broadcast functions.

According to the embodiment of the present invention, a kind of computer-readable media is also provided, on which the computer-executable instructions are stored. When the instructions are executed by a computer or a processor, the process from Step S101 to Step S103, as shown in FIG. 1, will be performed by the computer or the processor. Preferably, the above embodiment will be preformed.

Figure 5:
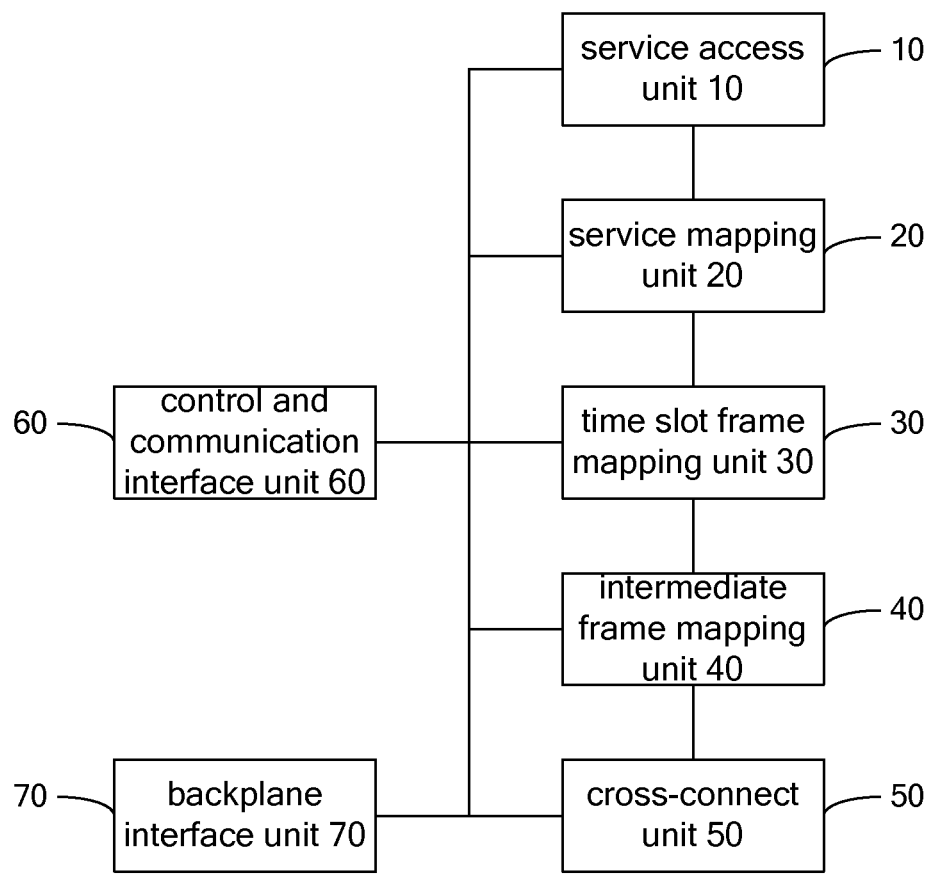
FIG. 5 is a structure schematic diagram of an apparatus for realizing cross-connect of ODUk according to an embodiment of the present invention.

The apparatus for realizing cross-connect of ODUk provided in the embodiment of the present invention, as shown in FIG. 5, comprises: a service access unit 10, a service mapping unit 20, a time slot frame mapping unit 30, an intermediate frame mapping unit 40 and a cross-connect unit 50. The service access unit 10 is configured to carry out the service access. The service mapping unit 20 is configured to map the services accessed by the service access unit 10 to the ODUk, and particularly to map the accessed services to the related ODUk according to the bandwidth capacity of the services; furthermore, the service mapping unit 20 can also carry out operations of de-mapping different services to ODUk, and the procedure of de-mapping is just opposite to that of mapping. The time slot frame mapping unit 30 is configured to map the services which are mapped to the ODUk to ODUk time slot frames according the requirement of the time slot frames. The intermediate frame mapping unit 40 is configured to map the ODUk time slot frames to intermediate frame structures, and preferably, different time slot frames may be packaged into an intermediate frame structure together by time slots; furthermore, the intermediate frame mapping unit 40 may also carry out operations of de-mapping the ODUk time slot frames to the intermediate frames, and the procedure of de-mapping is just opposite to that of mapping. The cross-connect unit 50 is configured to perform cross-connect for the ODUk services in the intermediate frame structures.

Preferably, the apparatus may further comprise a control and communication interface unit 60, which is configured to control the operations of the service mapping unit 20, the time slot frame mapping unit 30 and the intermediate frame mapping unit 40.

Preferably, the apparatus may further comprise a backplane interface unit 70, which is configured to transport the scheduled services.

In conclusion, the solution provided by the embodiments of the present invention can directly support the cross-connect of ODUk, without carrying out the operations of mapping and de-mapping from OTN services to SDH services, so the solution is more suitable for the cross-connect of OTN services and simple to be implemented. Moreover, the solution can take full advantages of bandwidth and achieve the objective for crossing ODUk, due to appropriate granularity in the cross-connect and it has higher resource utilization factor and integration level.

In addition, according to the implementation of the present invention, the system architecture and current processing flows have not been made any changes, so as to implement easily and facilitate its popularization in the technology field with higher industrial application.

Above description is only to illustrate the better embodiments but not to limit the protection scope of the present invention.

What a claimed is:

1. A method for realizing cross-connect of optical channel data unit-k (ODUk), comprising:
    mapping accessed services to ODUk, and mapping the services mapped to the ODUk to ODUk time slot frames according to requirements of time slot frames;
    mapping the ODUk time slot frames to intermediate frame structures, wherein the different ODUk time slot frames are packaged into one of the intermediate frame structures according to the time slots of the different ODUk time slot frames;
    performing cross-connect for the ODUk services in the intermediate frame structures.

2. The method for realizing cross-connect of ODUk according to claim 1, wherein the step of mapping the accessed services to the ODUk is specifically mapping the accessed services to a related ODUk according to the bandwidth capacities of the services.

3. The method for realizing cross-connect of ODUk according to claim 1, further comprising: different ODUk time slot frames having different numbers of padding areas.

4. An apparatus for realizing cross-connect of ODUk, comprising:
    a service access unit configured to carry out service access;
    a service mapping unit configured to map the services accessed by the service access unit to ODUk;
    a time slot frame mapping unit, configured to map the services mapped to the ODUk to the ODUk time slot frames according the requirements of the time slot frames;
    an intermediate frame mapping unit, configured to map the ODUk time slot frames to intermediate frame structures, wherein the different ODUk time slot frames are packaged into one of the intermediate frame structures according to the time slots of the different ODUk time slot frames;
    a cross-connect unit configured to perform cross-connect for the ODUk services in the intermediate frame structures.

5. The apparatus for realizing cross-connect of ODUk according to claim 4, wherein the service mapping unit is further configured to map the accessed services to the related ODUk according the bandwidth capacity of services.

6. The apparatus for realizing cross-connect of ODUk according to claim 5, wherein the apparatus further includes a control and communication interface unit, which is configured to control operations of the service mapping unit, the time slot frame mapping unit and the intermediate frame mapping unit.

7. The apparatus for realizing cross-connect of ODUk according to claim 5, wherein the apparatus further comprises a backplane interface unit, which is configured to transmit the ODUk services after the cross-connect.

8. The apparatus for realizing cross-connect of ODUk according to claim 4, wherein the apparatus further includes a control and communication interface unit, which is configured to control operations of the service mapping unit, the time slot frame mapping unit and the intermediate frame mapping unit.

9. The apparatus for realizing cross-connect of ODUk according to claim 4, wherein the apparatus further comprises a backplane interface unit, which is configured to transmit the ODUk services after the cross-connect.

10. The apparatus for realizing cross-connect of ODUk according to claim 4, wherein the apparatus further comprises a control and communication interface unit, which is configured to control operations of the service mapping unit, the time slot frame mapping unit and the intermediate frame mapping unit.

11. The apparatus for realizing cross-connect of ODUk according to claim 4, wherein the apparatus further comprises a backplane interface unit, which is configured to transmit the ODUk services after the cross-connect.

* * * * *